United States Patent
Shiire et al.

(10) Patent No.: US 7,901,582 B2
(45) Date of Patent: *Mar. 8, 2011

(54) PHOSPHORUS RECOVERY METHOD AND PHOSPHORUS RECOVERY SYSTEM

(75) Inventors: Hidetake Shiire, Tokyo (JP); Nobuyuki Ashikaga, Kanagawa-ken (JP); Satoshi Haraguchi, Tokyo (JP); Tokusuke Hayami, Tokyo (JP); Tatsuoki Kono, Tokyo (JP); Akiko Suzuki, Tokyo (JP); Shinetsu Fujieda, Kanagawa-ken (JP); Katsuya Yamamoto, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/406,736

(22) Filed: Mar. 18, 2009

(65) Prior Publication Data

US 2009/0238746 A1 Sep. 24, 2009

(30) Foreign Application Priority Data

Mar. 19, 2008 (JP) .................. 2008-071384

(51) Int. Cl.
  *B01D 15/08* (2006.01)
  *B01D 9/02* (2006.01)
(52) U.S. Cl. ........... 210/660; 23/300; 210/663; 210/667; 210/906
(58) Field of Classification Search .......... 423/299–323; 23/300; 210/660, 663, 667, 906
See application file for complete search history.

(56) References Cited

U.S. PATENT DOCUMENTS

| | | | |
|---|---|---|---|
| 2009/0028770 A1* | 1/2009 | Mae et al. | 423/304 |
| 2009/0048103 A1 | 2/2009 | Suzuki et al. | |

FOREIGN PATENT DOCUMENTS

| | | | |
|---|---|---|---|
| JP | 07-251141 | | 10/1995 |
| JP | 2004-261640 | | 9/2004 |
| JP | 2004275839 A | * | 10/2004 |
| JP | 2005-288366 | | 10/2005 |
| JP | 2006-035027 | | 2/2006 |
| JP | 2006-346546 | | 12/2006 |
| JP | 2007-117948 | | 5/2007 |

* cited by examiner

*Primary Examiner* — Wayne Langel
*Assistant Examiner* — Syed Iqbal
(74) *Attorney, Agent, or Firm* — Finnegan, Henderson, Farabow, Garrett & Dunner, L.L.P.

(57) ABSTRACT

A phosphorus recovery method and a phosphorus recovery system which can make equipment size small, and can be added easily also to an existing wastewater treatment facility, and can recover phosphorus by low cost, are provided. A phosphorus compound adsorption material includes a nitrogen containing compound which has an amino group at an end of molecular structure, a carrier supporting the nitrogen containing compound, and zinc ion or iron ion fixed to the nitrogen containing compound. After passing water to be treated containing phosphorus to an adsorption tower filled up with this phosphorus compound adsorption material to make phosphorus stick to the phosphorus compound adsorption material, a drug solution for desorption is supplied to the adsorption tower, and phosphorus is desorbed in liquid and is recovered.

8 Claims, 5 Drawing Sheets

PHOSPHORUS RECOVERY METHOD AND PHOSPHORUS RECOVERY SYSTEM

CROSS REFERENCE TO RELATED APPLICATION

This application is based upon and claims the benefit of priority from the Japanese Patent Application No. 2008-071384, filed on Mar. 19, 2008, the entire contents of which are incorporated herein by reference.

FIELD OF THE INVENTION

The present invention relates to a phosphorus recovery method and a phosphorus recovery system which use wastewater containing phosphorus from a sewage plant, an industrial wastewater treatment plant, a livestock wastewater treatment plant, a river, a lake, etc. as water to be treated to recover phosphorus contained in the water to be treated.

DESCRIPTION OF THE BACKGROUND

Phosphorus which occupies about 1% of people's weight is an element which constitutes DNA (deoxyribonucleic acid) which is a main body of a gene, ATP (adenosine triphosphate) which is required for energy metabolism and hydroxyapatite which is a main substance of a bone or a tooth. Phosphorus is an essential mineral in order for human beings to maintain life activity. Phosphorus is extracted from rock phosphate. It is said that an amount of deposits of phosphorus which can be mined are about 7 billion ton worldwide and it will be drained in about 100 years if an amount of consumption of phosphorus will increase at a rate of 2% every year from now on.

On the other hand, eventually phosphorus incorporated into agricultural products comes to be contained in wastewater via a human body, livestock, etc. The wastewater flowed into a closed water area and phosphorus has caused an environmental problem of eutrophication.

75% of phosphorus used in Japan is fixed as insoluble phosphorus in soil. However, about 10% of phosphorus is discharged via sewage or the wastewater of a factory, etc. in the water area. For this reason, recovering and recycling phosphorus from the wastewater becomes one of measures against the resource drain and the eutrophication. As techniques of recovering phosphorus, various methods, such as HAP method and MAP method which recovers phosphorus from the wastewater by chemical precipitation, and an elution method which elutes and recovers phosphorus from sludge incineration ashes using an acid and an alkali, etc. have so far been proposed.

The HAP method is a method of recovering phosphorus using a crystallization phenomenon (refer to, for example, the Japanese patent application public No. 2004-261640). In the HAP method, after $Ca^{2+}$ and $OH^-$ were added to solution containing phosphorus and the solution was made into a supersaturation state (metastable region), the solution is led to a dephosphorus tank. The solution contacts dephosphorus material (rock phosphate, bone black, calcium silicate hydration liquid, etc.) in the tank, the hydroxyapatite (HAP:$Ca_{10}(OH_2)(PO_4)_6$) crystal precipitates on a filter material surface and phosphorus in a liquid is removed.

The MAP method is a method of recovering phosphorus using a crystallization phenomenon for a liquid containing phosphorus and ammonium (refer to, for example, the Japanese patent application public No. 2007-117948). In the MAP method, $Mg^{2+}$ is added to object wastewater and MAP ($MgNH_4PO_4$) is generated in a weak alkali region (it grows up to be granulation which is 2-3 mm). An acid and alkaline elution method is a technique in which phosphorus in incineration ashes is eluted with the acid or the alkali and phosphate is extracted by solid liquid separation (refer to, for example, the Japanese patent application publication No. Hei 07-251141).

However, in the HAP method and the MAP method, in order to grow up HAP grains and MAP grains into a grain size which can be separated and recovered, sufficient reaction time is required. For this reason, a reaction tank of a large volume (superficial velocity=about 10 $h^{-1}$ or less) is needed, and a large-scale equipment occupation area is needed. Therefore, equipment requires expense and it also becomes difficult to add the equipment to existing wastewater treatment facility. In addition, since a pH adjuster is added as pretreatment and Ca ion or Mg ion is added, chemicals cost is required and phosphorus recovery cost (running cost) increases. Furthermore, the wastewater after phosphorus recovery is changed in water quality owing to an additive etc. For this reason, when the wastewater after phosphorus recovery is returned to the existing wastewater treatment facility and is treated further, it is considered that water quality adjustment treatment is also needed before.

In the acid and alkaline elution method, since processing time becomes long, equipment becomes large-scale. Furthermore, a treatment facility for incineration ashes residue and the acid and the alkali is needed. In the acid elution, there is a possibility that heavy metals other than phosphorus may mix.

SUMMARY OF THE INVENTION

The purpose of the present invention is to provide a phosphorus recovery method and a phosphorus recovery system which can make equipment size small, can also be added to an existing wastewater treatment facility easily and can recover phosphorus by low cost.

The phosphorus recovery method according to one embodiment of the present invention has passing water to be treated containing phosphorus to an adsorption tower filled up with phosphorus compound adsorption material including a nitrogen containing compound having an amino group at an end of molecular structure, a carrier supporting the nitrogen containing compound and a zinc ion or iron ion fixed to the nitrogen containing compound to make phosphorus stick to the phosphorus compound adsorption material, and supplying drug solution for desorption to the adsorption tower to desorb in a liquid phosphorus adsorbed by the phosphorus compound adsorption material and to recover.

The phosphorus recovery system according to one embodiment of the present invention has an adsorption tower filled up with phosphorus compound adsorption material including a nitrogen containing compound which has an amino group at an end of molecular structure, a carrier supporting the nitrogen containing compounded and a zinc ion or iron ion fixed to the nitrogen containing compound, a water flow system for water to be treated configured to pass the water to be treated containing phosphorus in the adsorption tower to make phosphorus stick to the phosphorus compound adsorption material, and a drug solution supply system for desorption configured to supply a drug solution for desorption to the adsorption tower to desorb adsorbed phosphorus in a liquid.

DETAILED DESCRIPTION OF THE INVENTION

Hereinafter, one embodiment of the present invention will be described using the drawings.

Figure 1:
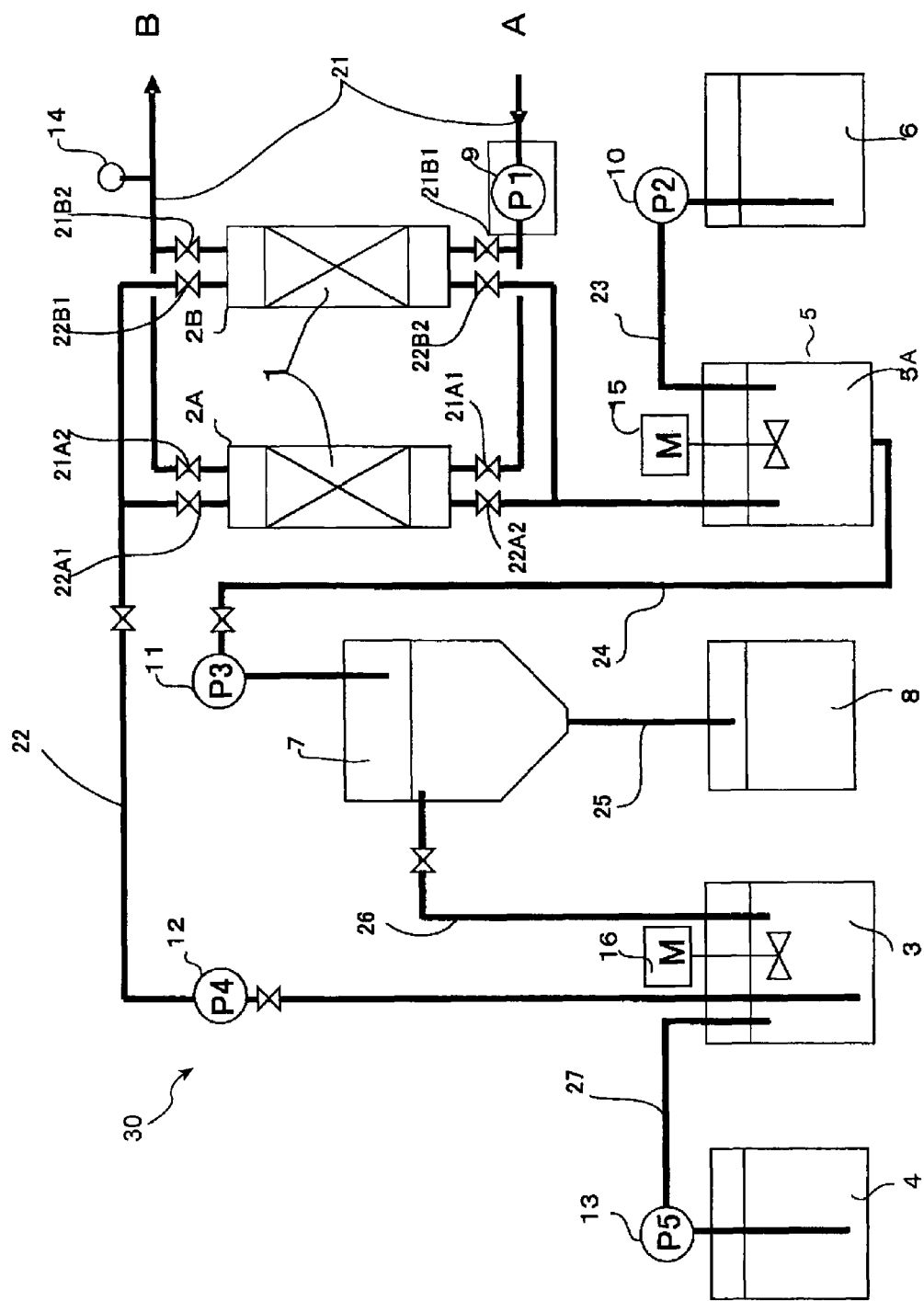
FIG. 1 is a block diagram of a phosphorus recovery system of one embodiment according to the invention.

First, a phosphorus recovery system will be explained. FIG. 1 is a diagram schematically illustrating configuration of the phosphorus recovery system according to the one embodiment. This phosphorus recovery system 30 is provided with adsorption towers 2A and 2B filled up with phosphorus compound adsorption material 1, drug solution tank 3 for desorption, drug solution tank 4 for component supply, precipitation device 5 for phosphorus, drug solution tank 6 for phosphorus precipitation, solid liquid separation device 7, phosphorus recovery tank 8, phosphorus concentration meter 14, agitators 15 and 16, and pumps 9-13.

Figure 4:
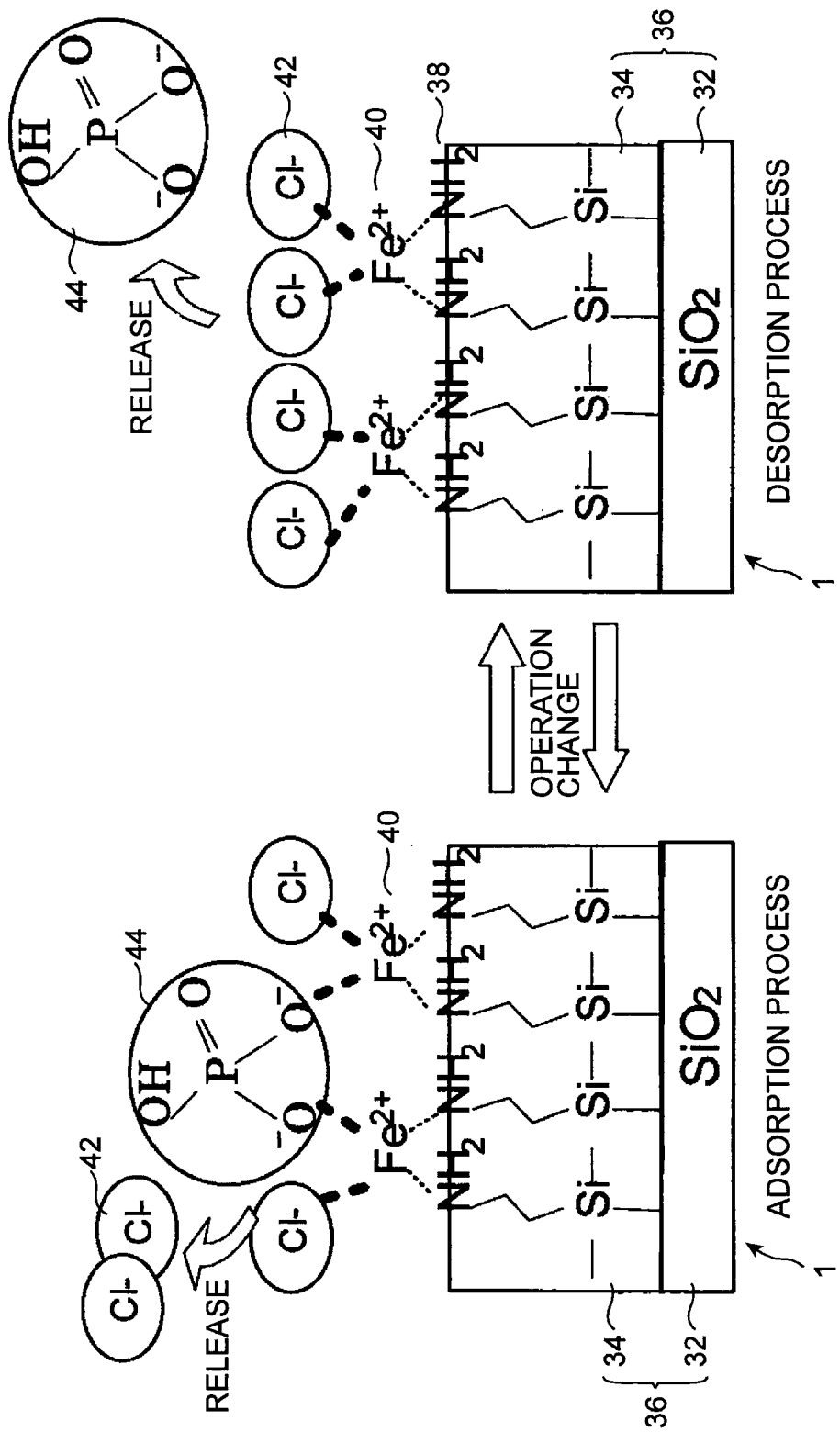
FIG. 4 is a diagram explaining an adsorption process and a desorption process in the embodiment.

A plurality of adsorption towers 2A and 2B (two sets are shown in FIG. 1) are provided so that continuous running of phosphorus recovery system 30 can be performed. Inside of these adsorption towers 2A and 2B, phosphorus compound adsorption material 1 is filled up. Phosphorus compound adsorption material 1 has a nitrogen containing compound which has an amino group at an end of molecular structure, a carrier which supports this nitrogen containing compound, and a zinc ion or iron ion fixed to the nitrogen containing compound. For example, as shown in FIG. 4, phosphorus compound adsorption material 1 has carrier 36 which includes granular silica gel 32 and silane coupling agent 34 attached to a surface of granular silica gel 32, nitrogen compound 38 supported by silane coupling agent 34, and iron ion 40 fixed to nitrogen compound 38. FIG. 4 enlarges and shows a surface portion of carrier 34.

In FIG. 1, 21 is a flow system for water to be treated, and flow system 21 passes various kinds of wastewater which contains phosphorus in adsorption towers 2A and 2B as water A to be treated. Phosphorus contained in this water A to be treated is adsorbed by phosphorus compound adsorption material 1 with which adsorption towers 2A and 2B are filled up. Wastewater from which phosphorus was removed is sent to other devices (not shown) as treated water B. Phosphorus concentration meter 14 is formed in passage for this treated water B, i.e., treated water outlet section of adsorption towers 2A, 2B and concentration of phosphorus contained in treated water B is measured. Valves 21A1, 21A2, 21B1 and 21B2 for selection switching are provided in an inlet section and an outlet section of each adsorption tower 2A, 2B of flow system 21 for water to be treated. Valves 21A1, 21A2 and valves 21B1, 21B2 are provided in order to make either one of adsorption tower 2A and 2B an adsorption process. When adsorption tower 2A is during adsorption process, valves 21A1 and 21A2 open and valves 21B1 and 21B2 close. When adsorption tower 2B is during adsorption process on the contrary, valves 21B1, 21B2 open and valves 21A1, 21A2 close.

22 is a drug solution supply system for desorption, and drug solution supply system 22 supplies drug solution for desorption (for example, basic supernatant liquor, neutral supernatant liquor, etc.) to adsorption towers 2A and 2B to desorb in a liquid phosphorus adsorbed by phosphorus compound adsorption material 1. As for this drug solution supply system 22 for desorption, one end (suction side) is open within drug solution tank 3 for desorption via pump 12. The other end (discharge side) of drug solution supply system 22 is connected with adsorption towers 2A, 2B via valves 22A1, 22B1 for switching, and is open within precipitation tank 5A for phosphorus via valves 22A2, 22B2 for switching from the opposite side of adsorption towers 2A, 2B. Valves 22A1, 22A2, 22B1 and 22B2 for switching are provided in order to make one of adsorption towers 2A or 2B a desorption process. While adsorption tower 2A is processing the desorption, valves 22A1, 22A2 open and valves 22B1, 22B2 close. While adsorption tower 2B is processing the desorption on the contrary, valves 22B1, 22B2 open and valves 22A1, 22A2 close.

In precipitation device 5, precipitation tank 5A stores the liquid containing phosphorus desorbed from phosphorus compound adsorption material 1, and a drug for solid substance precipitation is supplied to precipitate a solid substance within precipitation tank 5A. Piping 23 with pump 10 is formed between precipitation tank 5A and drug solution tank 6, and a drug solution for solid substance precipitation is supplied to precipitation tank 5A from drug solution tank 6. The drug solution for solid substance precipitation supplied to precipitation tank 5A and desorption liquor from adsorption towers 2A or 2B are agitated by agitator 15. Piping 24 with pump 11 is formed between precipitation tank 5A and solid liquid separation device 7, and precipitate (phosphorus) which precipitated in the liquid in precipitation tank 5A is transported to solid liquid separation device 7.

Solid liquid separation device 7 separates the precipitate and the liquid from the liquid containing the precipitate (phosphorus) transported from precipitation tank 5A. Phosphorus compound which is separated solid substance is recovered by phosphorus recovery tank 8 via piping 25. The separated liquid is returned to drug solution tank 3 for desorption via piping 26 and is reused as the desorption liquor. This drug solution tank 3 is connected with drug solution tank 4 for component supply by piping 27 for component supply which has pump 13. Component (hydroxy ion or chloride ion) for desorption liquor is supplied to drug solution tank 3 from drug solution tank 4. In drug solution tank 3, the component supplied from drug solution tank 4 and the liquid returned from solid liquid separation device 7 are agitated by agitator 16, and the drug solution for desorption of predetermined concentration is generated.

Figure 5:
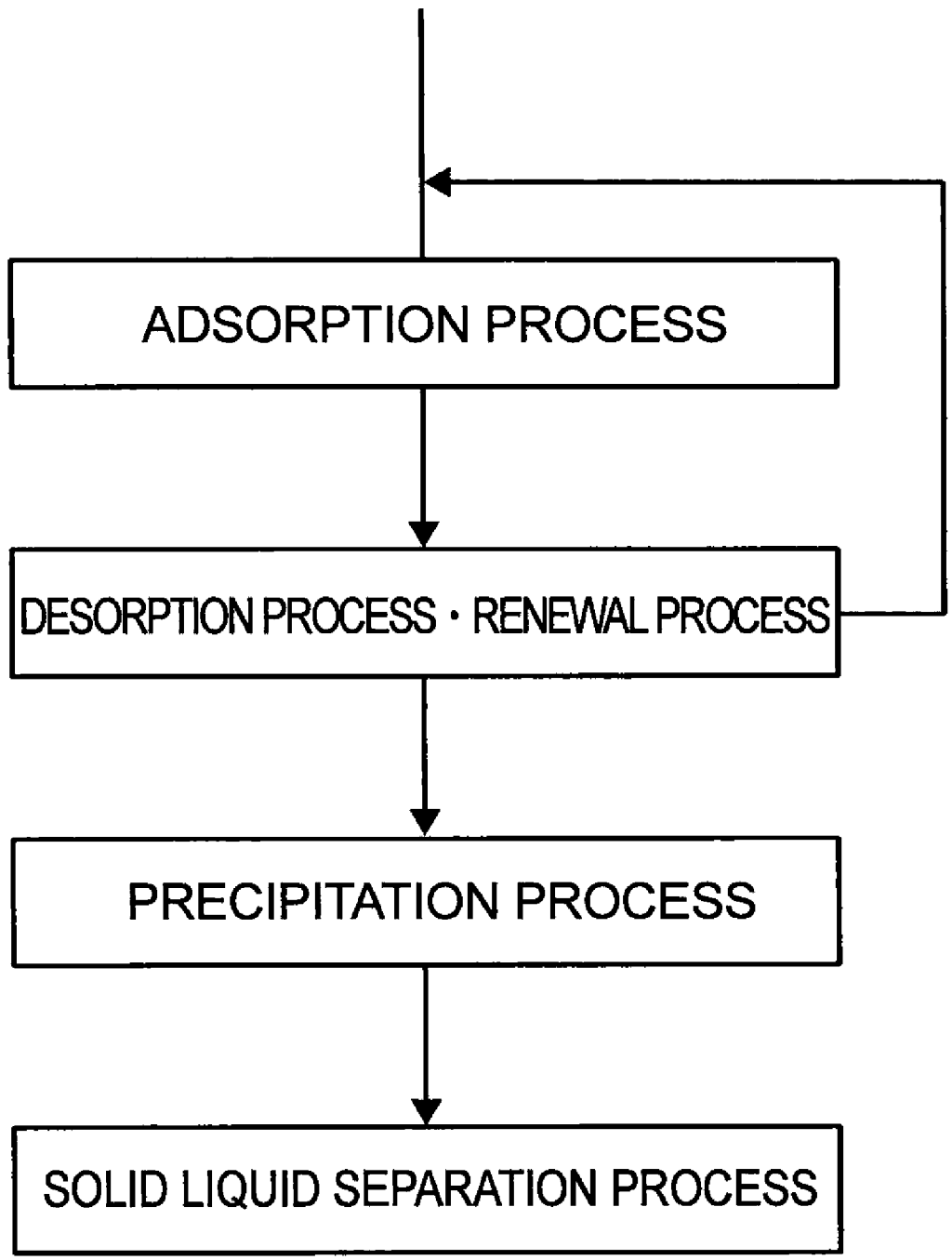
FIG. 5 is a drawing showing an example of a process of a phosphorus recovery method according to the embodiment.

Next, a phosphorus recovery method which uses phosphorus recovery system 30 will be explained. In this embodiment, as shown in FIG. 5, the adsorption process, the desorption process, a renewal process, a precipitation process and a solid liquid separation process are included. First, the adsorption process which makes phosphorus stick to phosphorus compound adsorption material 1 will be explained. In phosphorus recovery system 30 of above-mentioned composition, when the adsorption treatment is performed by using various kinds of wastewater containing phosphorus as water A to be treated, valves 21A1 and 21A2 of flow system 21 for water to be treated are opened, and water A is passed in one adsorption tower 2A. At this time, valves 21B1 and 21B2 corresponding to another adsorption tower 2B are closed. Water A which is passed in adsorption tower 2A contacts phosphorus compound adsorption material 1 with which an inside of adsorption tower 2A is filled up, and phosphorus contained in water A is caught by phosphorus compound adsorption material 1. In the adsorption process, as shown in FIG. 4, chloride ion 42 is substituted by phosphoric acid ion 44, and phosphoric acid ion 44 is caught by phosphorus compound adsorption material 1. Thereby, phosphorus concentration of treated water B at the outlet of adsorption tower 2A becomes 0. However, since there is a limit in phosphorus amount which phosphorus compound adsorption material 1 can adsorb, when a certain time passes, phosphorus compound adsorption material 1 is broken through and phosphorus begins to leak to the outlet side of adsorption tower 2A. This change of state is measured by phosphorus concentration meter 14.

For example, if discharge of phosphorus is restricted by an emission standard of phosphorus, etc., it is necessary to hold down phosphorus concentration to below the value. In this case, before the phosphorus concentration at the outlet of adsorption tower 2A exceeds the limit value using measurement values by phosphorus concentration meter 14, a water flow to adsorption tower 2A is stopped and adsorption treatment is switched to adsorption tower 2B. This switching is performed by closing valves 21A1 and 21A2, and opening valves 21B1 and 21B2 by a controller which is not illustrated.

Figure 2:
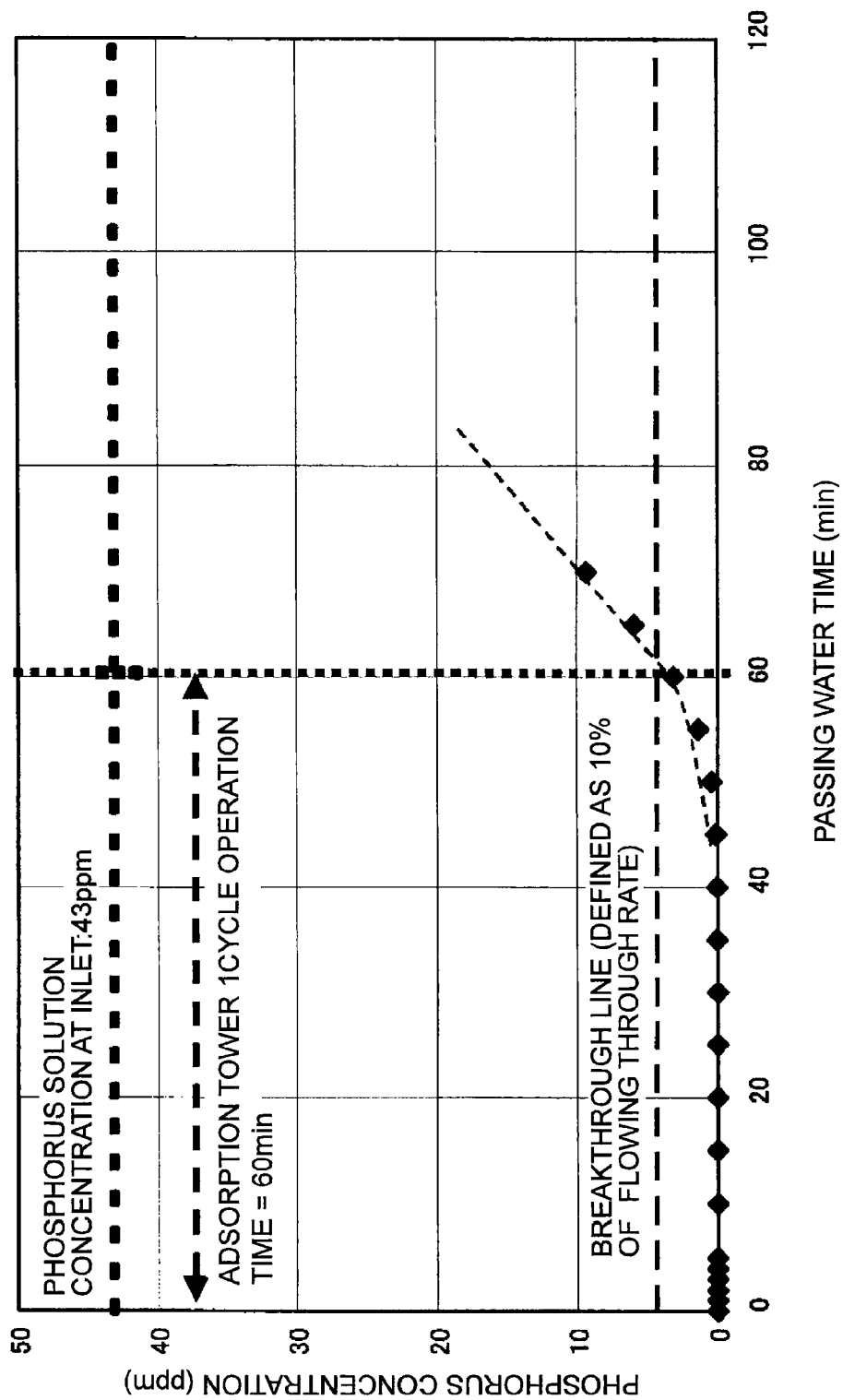
FIG. 2 is a curve showing a result of an adsorption test of the embodiment.

FIG. 2 shows an example of variation with time of the phosphorus concentration at the outlet of the adsorption tower when the wastewater with phosphorus concentration of 43 ppm passes through the adsorption tower filled up with phosphorus compound adsorption material 1. Phosphorus began to be detected at the outlet around at 50 minutes after the water flow, the breakthrough occurred after about 60-minute elapse (here, the breakthrough is defined as 10% of flowing through rate), and the phosphorus concentration at the outlet continued a rise after that. Therefore, the switching between adsorption towers 2A and 2B can be performed by measuring the phosphorus concentration of treated water B which changes in this way by phosphorus concentration meter 14.

Timing of the switching between adsorption towers 2A and 2B is not restricted to this. Time taken to reach the breakthrough is computable in advance using phosphorus adsorption capability of phosphorus compound adsorption material 1, phosphorus content of water A to be treated, the water flow amount of water A and quantity of phosphorus compound adsorption material 1 with which the adsorption tower is filled up. For this reason, when it is difficult to measure the phosphorus concentration at the outlet of the adsorption tower by phosphorus concentration meter 14, operation which switches the adsorption tower for every computed fixed time may perform continuation recovery operation of phosphorus.

Next, the desorption process which desorbs phosphorus from phosphorus compound adsorption material 1, and the renewal process which renews phosphorus compound adsorption material 1 will be explained. When phosphorus adsorption capability of phosphorus compound adsorption material 1 is saturated, the adsorption process is completed. To adsorption tower 2A which completed the adsorption process, valves 21A1, 21A2 are closed and valves 22A1, 22A2 of the drug solution supply system for desorption are opened, and the drug solution for desorption is supplied from drug solution tank 3 with pump 12. At this time, valves 22B1 and 22B2 to adsorption tower 2B which shifted to the adsorption process, are in a closed state, of course. Phosphorus adsorbed by phosphorus compound adsorption material 1 is desorbed in the liquid in adsorption tower 2A by supply of the drug solution for desorption, and the liquid is stored in precipitation tank 5A. To phosphorus compound adsorption material 1 from which phosphorus was desorbed, the renewal treatment is given in preparation for the following adsorption process, if needed.

Figure 3:
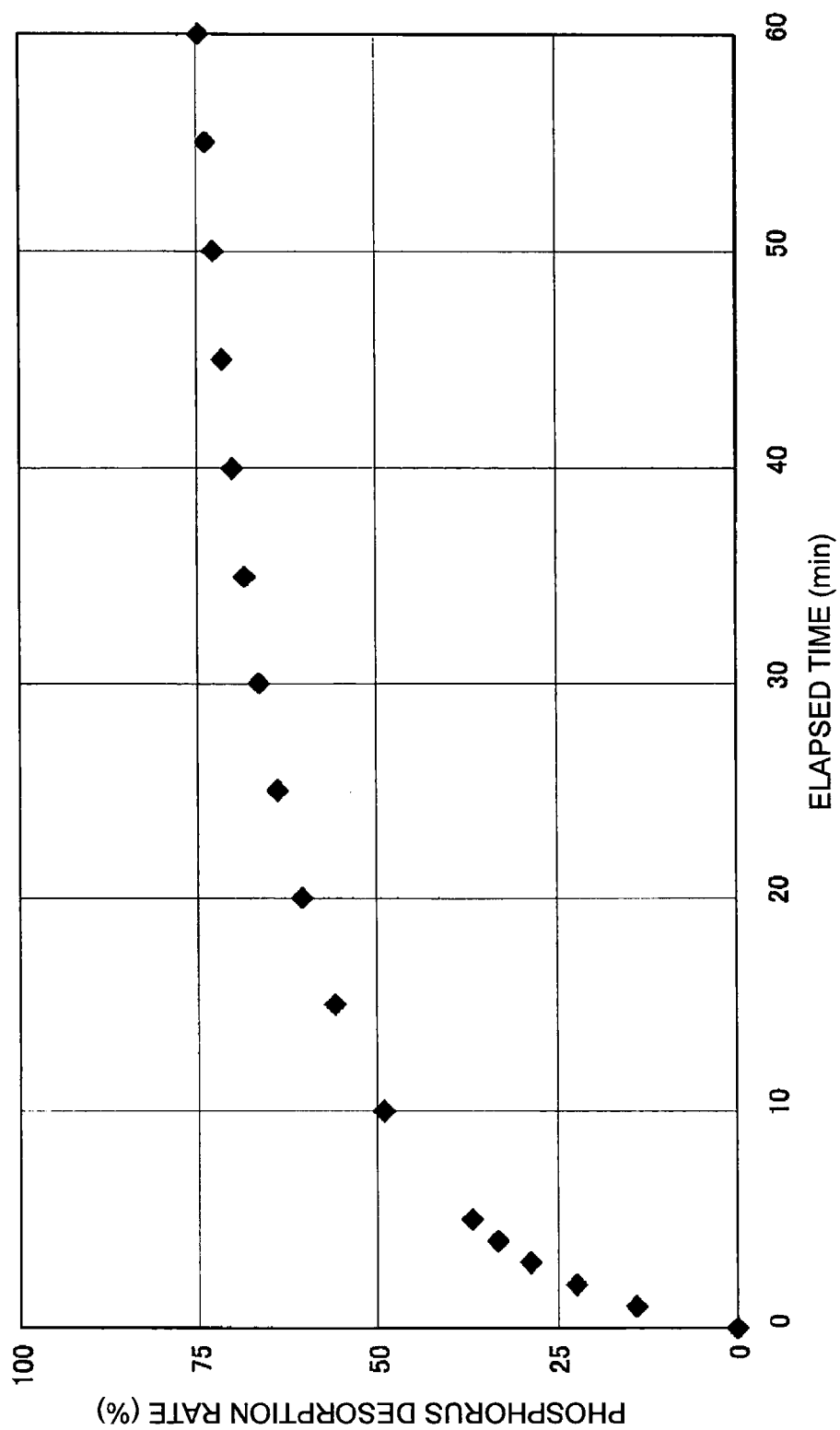
FIG. 3 is a curve showing a result of a desorption test of the embodiment.

As the drug solution used for the desorption process, basic desorption liquor and neutral desorption liquor can be used. Although an NaOH aqueous solution and an NaCl aqueous solution are representative examples of the drug solution, it is not limited to these. FIG. 3 shows a curve indicating a result of having desorbed phosphorus from phosphorus compound adsorption material 1 by the NaCl aqueous solution of 1 mol/l concentration.

In the desorption process, the NaCl aqueous solution which is a neutral desorption liquor, for example as the drug solution for desorption is passed through phosphorus compound adsorption material 1 which caught phosphoric acid ion. In this case, as shown in FIG. 4, under existence of excess chloride ion 42, phosphoric acid ion 44 replaces chloride ion to be eluted in the liquid, and the desorption of phosphorus is made. In connection with this, phosphorus compound adsorption material 1 becomes in an initial state in which phosphorus adsorption is possible and phosphorus compound adsorption material 1 is renewed. In this case, the renewal process is included in the desorption process.

The NaOH aqueous solution which is basic desorption liquor as the drug solution for desorption can also be used. Although not illustrated, if the NaOH aqueous solution is passed through phosphorus compound adsorption material 1 which caught phosphoric acid ion, under existence of excess hydroxy-ion, phosphoric acid ion replaces hydroxy-ion to be eluted in liquid, and the desorption of phosphorus is made. In this case, since hydroxy-ion and iron combine to generate insoluble iron hydroxide, an HCl aqueous solution, which is an acidic solvent as a liquid for renewal, is passed. Thereby, insoluble iron hydroxide is dissolved and phosphorus compound adsorption material 1 is supplemented with chloride ion, and phosphorus compound adsorption material 1 becomes in a state in which phosphorus adsorption is possible and phosphorus compound adsorption material 1 is renewed. Therefore, in this case, the renewal process is performed after the desorption process.

Next, the precipitation process which precipitates phosphorus and the solid liquid separation process will be explained. Precipitation tank 5A stores phosphorus desorbed from phosphorus compound adsorption material 1 with the liquid. The drug solution for precipitating solid substance is supplied to precipitation tank 5A from drug solution tank 6 by pump 10. The drug solution and the liquid containing phosphorus desorbed are agitated by agitator 15 to precipitate phosphorus as the solid substance. The precipitate is supplied to solid liquid separator 7 by pump 11 and the precipitate is separated into the solid substance and the separated liquid here. The solid substance is recovered and recycled by phosphorus recovery tank 8 as phosphorus compound. For example, by adding Ca ion as the drug solution in the precipitation process, phosphorus can be recovered as calcium phosphate which can be used as a fertilizer. In addition, the liquid containing phosphorus desorbed from phosphorus compound adsorption material 1 can be condensed by concentrating means which is not illustrated, to recover phosphorus compound as the solid substance.

The separated liquid separated by solid liquid separator 7 is returned to drug solution tank 3, and the separated liquid is repeatedly used as the drug solution for desorption. At this time the component which runs short in execution of desorption is supplied to drug solution tank 3 from drug solution tank 4 by pump 13 and is mixed by agitator 16. For example, when NaOH is used as the drug solution for desorption, hydroxy ion which moved to phosphorus compound adsorption material 1 side in the desorption process is supplied from drug solution tank 4. When NaCl is used as a drug solution for desorption, chloride ion which moved to phosphorus compound adsorption material 1 side in the desorption process is supplied from drug solution tank 4. However, since chloride ion becomes excess when phosphorus is recovered as calcium phosphate using $CaCl_2$ in the precipitation process, supplement of chloride ion from drug solution tank 4 becomes unnecessary.

Now, in phosphorus recovery system 30 shown in FIG. 1, it has two sets of adsorption towers 2A and 2B. For this reason, a phosphorus recovery processing can be continuously performed by repeating the adsorption process, and the desorption process and the renewal process alternately by two sets of adsorption towers 2A and 2B. That is, adsorption tower 2B performs the desorption process and the renewal process when adsorption tower 2A performs the adsorption process, and adsorption tower 2B performs the adsorption process when adsorption tower 2A performs the desorption process and the renewal process. In addition, when time which the desorption process and the renewal process take is shorter than time which the adsorption process takes, operation which repeats two sets of the adsorption towers alternately can be performed. However, when time which the desorption process and the renewal process take is longer than time which the adsorption process takes, continuous operation is possible by operating a plurality of adsorption towers more than three sets in order.

Thus, according to the phosphorus recovery method and the phosphorus recovery system by the embodiment of the present invention, the water to be treated containing phosphorus is passed through the adsorption tower which is filled up with phosphorus compound adsorption material and phosphorus is adsorbed by the phosphorus compound adsorption material. Then, the drug solution for desorption is supplied to the adsorption tower, and adsorbed phosphorus is desorbed in the liquid and is recovered. And the phosphorus compound adsorption material is renewed to the state in which phosphorus adsorption is possible. Consequently, since the adsorption of phosphorus and the desorption of phosphorus are performed by the phosphorus compound adsorption material repeatedly, the equipment size can be made small. The phosphorus recovery system according to the invention can be easily added also to the existing wastewater treatment facility and can recover phosphorus by low cost. Furthermore, when processing the wastewater after recovering phosphorus, the existing wastewater treatment facility is not affected.

Other embodiments or modifications of the present invention will be apparent to those skilled in the art from consideration of the specification and practice of the invention disclosed herein. It is intended that the specification and example embodiments be considered as exemplary only, with a true scope and spirit of the invention being indicated by the following.

What is claimed is:

1. A phosphorus recovery method, comprising:
    passing water to be treated containing phosphorus to an adsorption tower filled up with phosphorus compound adsorption material including a nitrogen containing compound having an amino group at an end of molecular structure, a carrier supporting said nitrogen containing compound, and a zinc ion or an iron ion chemically bonded to said nitrogen containing compound to make phosphorus stick to said phosphorus compound adsorption material; and
    supplying a drug solution for desorption to said adsorption tower to desorb phosphorus adsorbed to said phosphorus compound adsorption material in liquid after said passing said water to be treated containing phosphorus to said adsorption tower.

2. The phosphorus recovery method according to claim 1, wherein said supplying said drug solution for desorption includes renewing said phosphorus compound adsorption material in a state in which phosphorus adsorption is possible.

3. The phosphorus recovery method according to claim 1, further comprising:
    renewing said phosphorus compound adsorption material in a state in which phosphorus adsorption is possible after said supplying said drug solution for desorption.

4. The phosphorus recovery method according to claim 1, wherein said passing said water to be treated containing phosphorus to said adsorption tower and said supplying said drug solution for desorption are repeated.

5. The phosphorus recovery method according to claim 2 or claim 3, wherein plural adsorption towers are connected in parallel, and while said passing said water to be treated containing phosphorus to said adsorption tower is performed to one of said adsorption towers, said supplying said drug solution for desorption and said renewing said phosphorus compound adsorption material are performed to another of said adsorption towers.

6. The phosphorus recovery method according to claim 5, wherein said passing said water to be treated containing phosphorus to said adsorption tower is continuously performed to said plural adsorption towers.

7. The phosphorus recovery method according to claim 1, further comprising:
    measuring phosphorus concentration of treated water at a treated water outlet of said adsorption tower; and
    switching said adsorption tower from passing said water to be treated containing phosphorus to said adsorption tower to supplying said drug solution for desorption when said phosphorus concentration becomes higher than an upper limit defined beforehand.

8. The phosphorus recovery method according to claim 1, further comprising:
    switching said passing said water to be treated containing phosphorus to said adsorption tower to said supplying said drug solution for desorption when a processing time of said passing said water to be treated containing phosphorus to said adsorption tower passes a predetermined time.

* * * * *